E. HARTLEY.
ANTISKID ATTACHMENT.
APPLICATION FILED FEB. 23, 1916.
1,247,529.
Patented Nov. 20, 1917.
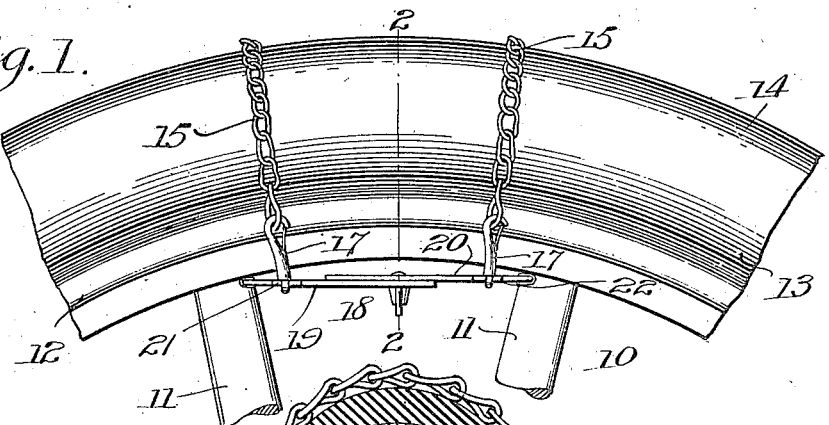
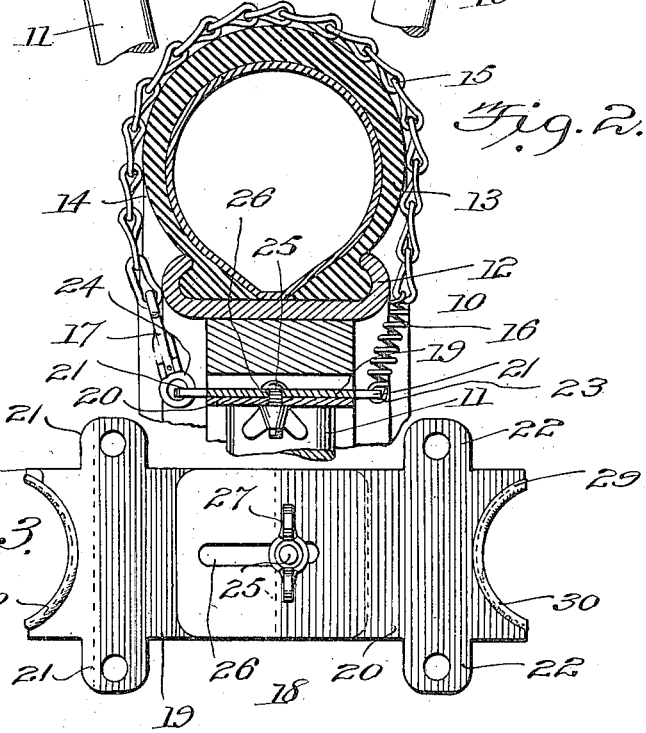
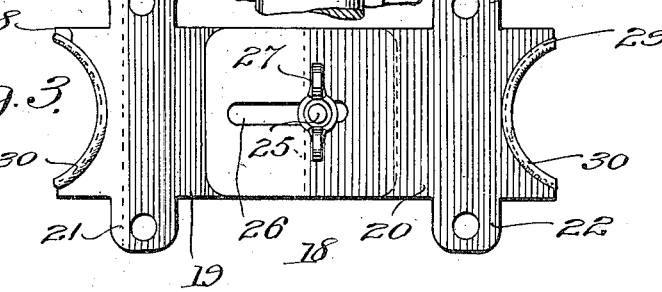
Inventor
E. Hartley
By Victor J. Evans
Attorney
Witness
W. S. McDowell

UNITED STATES PATENT OFFICE.

ERNEST HARTLEY, OF PHILADELPHIA, PENNSYLVANIA.

ANTISKID ATTACHMENT.

1,247,529.

Specification of Letters Patent.   Patented Nov. 20, 1917.

Application filed February 23, 1916. Serial No. 80,019.

*To all whom it may concern:*

Be it known that I, ERNEST HARTLEY, a citizen of the United States, residing at Philadelphia, in the county of Philadelphia and State of Pennsylvania, have invented new and useful Improvements in Antiskid Attachments, of which the following is a specification.

The invention relates to antiskid devices, for use on the usual pneumatic or other tires of vehicles, such as automobiles and the like, and an object of the invention is to provide an attachment which can be quickly applied to and is easily removed from the vehicle wheel and tire thereof, the attachment when applied, preventing the usual skidding of the vehicle over wet and slippery surfaces.

Among other features, the invention comprehends antiskidding elements such as chains or the like and which are adapted to partially encircle the tire and particularly extend across the tread surfaces of the tires, with suitable means for holding the antiskid elements in the desired position, at the same time permitting of the ready application of the device to the vehicle wheel and the quick removal of the device from the vehicle wheel when it is not necessary to use the same.

In the further disclosure of the invention reference is to be had to the accompanying drawings, constituting a part of this specification, and in which similar characters of reference denote corresponding parts in all the views, and in which—

Figure 1 is a fragmentary elevation of a vehicle wheel having a tire thereon, with my invention applied thereto, Fig. 2 is an enlarged vertical transverse sectional view, taken on the line 2—2 in Fig. 1, Fig. 3 is a bottom plan view of the invention.

Referring more particularly to the views, I disclose a vehicle wheel 10 having the usual spokes 11, and rim 12, the pneumatic tire 13 being disposed upon the rim and encircling the same. Partially encircling the tire 13 and extending transversely to the surface 14 thereof are anti-skid elements 15, which may be in the nature of chains of a suitable link construction, as shown, one end of each chain having connection with an end of a contractile helical spring 16 and the other end of each chain having removable connection with a snap hook 17. A holding and retaining member 18 is provided for holding the antiskid elements 15 in proper position, the holding and retaining element as shown in Fig. 3, consisting of plates 19, 20, each being substantially similar with the plate 19 having apertured ears 21 and the plate 20 provided with similar apertured ears 22, an end of the spring 16 being connected to one of the ears of each plate by an eye 23 with each snap hook 17 having connection with the other ear of each plate by an eye 24, the eyes 23, 24, passing through the apertures in the ears. A screw 25 passes through the plate 19 and through an elongated slot 26 in the plate 20, a thumb nut 27 being threaded onto the screw 25 to hold the plates in contact, at the same time permitting one plate to slide upon the other to increase or decrease the length of the element 18, the thumb nut when tightened up being adapted to bind the plates against relative movement. The plates 19 and 20 are formed with concaved end portions 28, 29, respectively and pads 30 are arranged upon the end portions and assume the concave configuration thereof. Referring to Fig. 1 it will be seen that the element 18 is applied to the vehicle wheel 10 between the adjacent spokes 11 thereof and at the juncture of the spokes with the rim, the plates being extended as far as they will go to span the space between the spokes with the cushions 30 bearing against the spokes and preventing direct contact of the plates with the spokes so as not to mutilate or scratch the finish thereof. The thumb nut 27 is now tightened, thus rigidly securing the plates in position and the relative angularity of the spokes will aid in rigidly retaining the element 18 in the desired place upon the wheel. The ends of the chains 15 are now engaged to the snap hooks 17 and thus it will be seen that the attachment is now in position to prevent skidding of the vehicle having the vehicle wheel shown with my device applied thereto, as set forth.

From the foregoing description it will be apparent that the device described consists of few and simple parts that can be cheaply manufactured and easily assembled and that the attachment can be applied to or removed from the vehicle wheel in a very short space of time, and furthermore will effectively perform the function for which it is desired.

Having thus described my invention I claim:—

An anti-skid attachment for vehicle wheels comprising a substantially rectangular element adapted to be disposed between two adjacent spokes of the wheel, said element embodying two overlapped relatively sliding sections, each section having its outer end cut away to conform to the configuration of the spoke to partly embrace the latter, and means for holding said sections fixed relatively in adjusted position, apertured ears projecting from the opposite longitudinal sides of each section adjacent the cut away portion, and a chain for each section, said chain partly encircling the tire and having its ends secured to said ears.

In testimony whereof I affix my signature in presence of two witnesses.

ERNEST HARTLEY.

Witnesses:
   Jno. Ennis, Jr.,
   Thomas J. Hooker.